Figure 1:
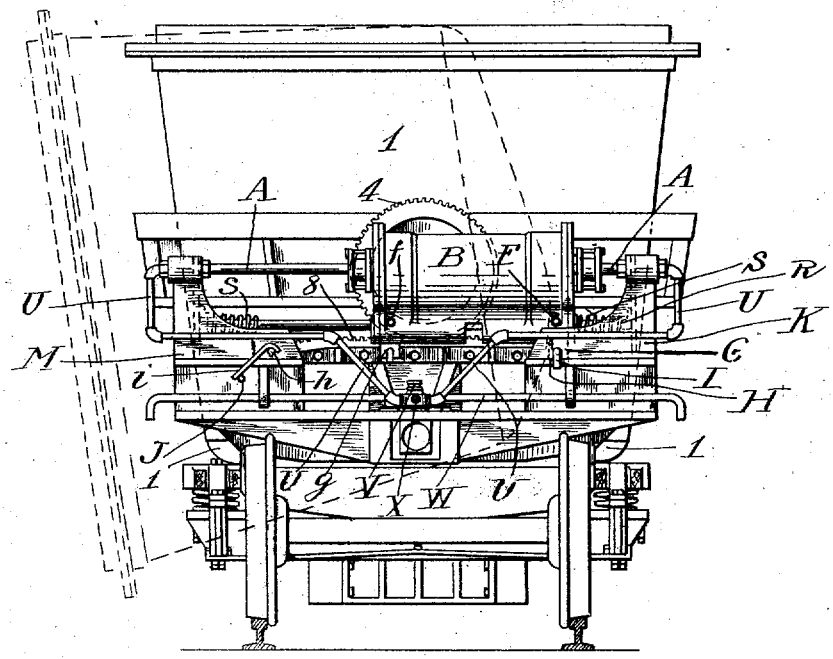

No. 12,714. REISSUED NOV. 5, 1907.

C. P. ASTROM.

MOTOR OPERATED DUMPING CAR.

APPLICATION FILED JUNE 3, 1907.

3 SHEETS—SHEET 1.

Witnesses:
Edmund O. Dubocq.
Geo. N. Kerr

Inventor
Carl P. Astrom
By his Attorneys
Edwards, Sager & Wooster.

No. 12,714. REISSUED NOV. 5, 1907.

C. P. ASTROM.

MOTOR OPERATED DUMPING CAR.

APPLICATION FILED JUNE 3, 1907.

3 SHEETS—SHEET 2.

Witnesses:

Edmund O. Dubocq.

Geo. N. Kerr.

Inventor

Carl P. Astrom

By his Attorneys

Edwards, Sager & Wooster

No. 12,714. REISSUED NOV. 5, 1907.

C. P. ASTROM.

MOTOR OPERATED DUMPING CAR.

APPLICATION FILED JUNE 3, 1907.

3 SHEETS—SHEET 3.

Witnesses:
Edmund O. Dubocq.
Geo. N. Kerr

Inventor
Carl P. Astrom
By his Attorneys
Edwards, Sager & Wooster

UNITED STATES PATENT OFFICE.

CARL P. ASTROM, OF ORANGE, NEW JERSEY, ASSIGNOR TO M. H. TREADWELL & CO., A CORPORATION OF NEW YORK.

MOTOR-OPERATED DUMPING-CAR.

No. 12,714. Specification of Reissued Letters Patent. Reissued Nov. 5, 1907.

Original No. 792,306, dated June 13, 1905, Serial No. 223,379. Application for reissue filed June 3, 1907. Serial No. 377,123.

*To all whom it may concern:*

Be it known that I, CARL P. ASTROM, a subject of the King of Sweden, and a resident of Orange, in the county of Essex and State of New Jersey, have invented a new and Improved Motor-Operated Dumping-Car, of which the following is a full, clear, and exact description.

My invention relates to improvements in motor-operated dumping-cars—that is, to improvements in cars which are dumped by means of a steam cylinder or compressed air, &c.

The general description of car to which my improvements are shown in the drawings as being applied is that described in my United States Letters Patent No. 755,207. This car is a cylinder-operated cinder-car, the cylinder reciprocating on a fixed piston and piston rod and under the influence of the motive fluid being adapted, through connections between the cylinder and one of the trunnions of the car body, to travel from one side of the car to the other, causing at the same time the car body to itself tilt and travel correspondingly, the car body being provided with two of said trunnions, with a gear wheel on each trunnion meshing with stationary racks upon which the said gear wheels travel.

The objects of my present improvements are to provide improved means for locking the reciprocating cylinder, and consequently the car body, in fixed position, also means for cushioning the moving parts, so as to take up the shock of impact as said moving parts travel from one extreme position to the other in dumping and righting the car body.

Figure 2:
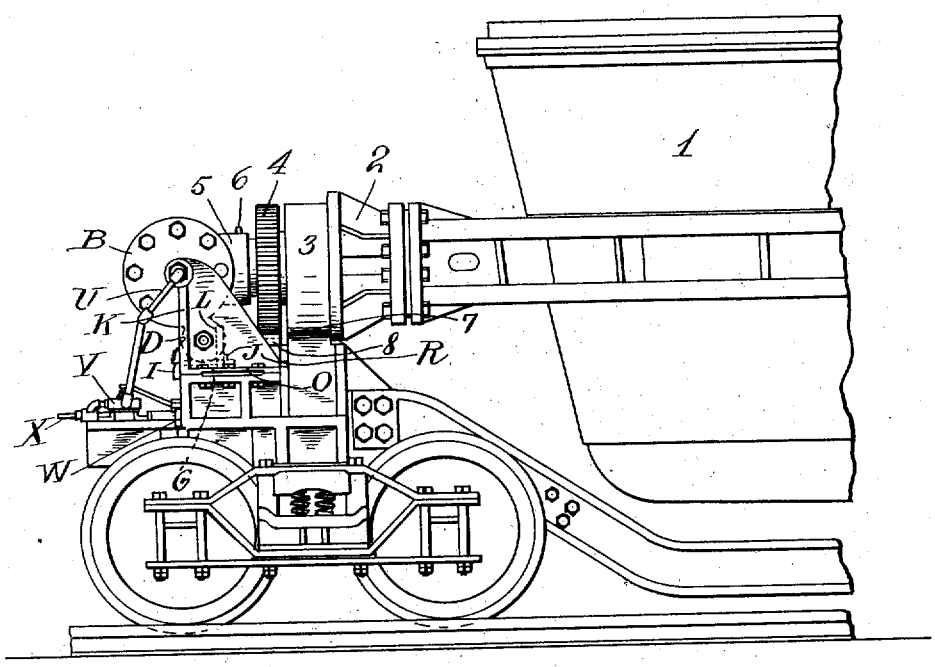
Figure 3:
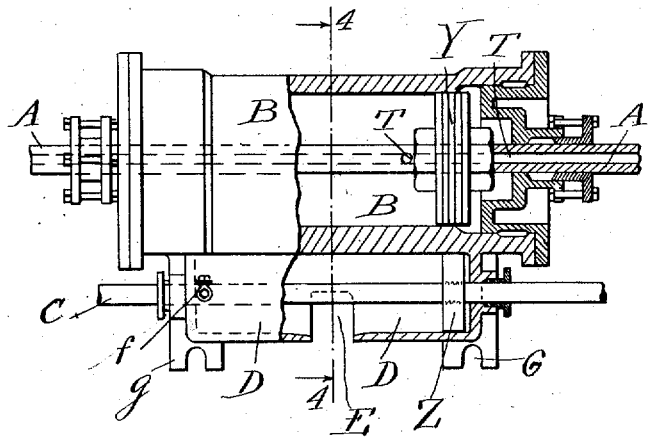
Figure 4:
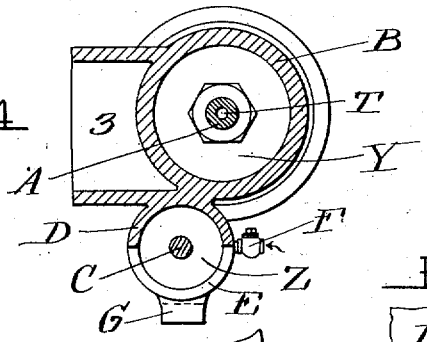
Figure 6:
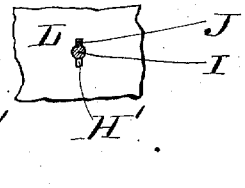
Figure 5:
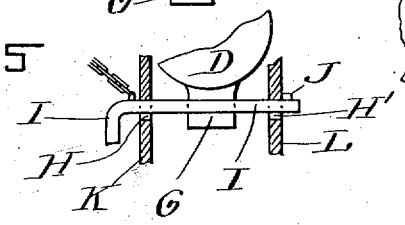

In the accompanying drawings, Figure 1 is an end elevation of a dumping car suitable for conveying cinder and embodying my improvements. Fig. 2 is a side elevation of one end of said car—to wit, the end shown in Fig. 1. Figs. 3, 4 and 5 are detail views, Fig. 3 being a side elevation, partly in section, of the motor cylinder, the cushion cylinder, and their related parts. Fig. 4 is a transverse section of Fig. 3 along the line 4—4 looking in the direction of the arrows. Fig. 5 is a detail of the locking pin in locking position. Fig. 6 is a view of the member L and of the pin I viewed from the right-hand side of Fig. 5.

1 is the car body mounted in a yoke 2 having at each end trunnions 3 and gears 4 rolling respectively on tracks carried by the pedestals of the car frame and racks 8.

B is a movable operating cylinder mounted to reciprocate on a fixed rod A between the sides of the frame and carrying a hollow casing 5 on its rear side. The hollow casing 5 receives the end of the trunnion 3 and a suitable bearing box, not shown. The hollow casing 5 also carries a detachable pin or key 6 which is adapted to fasten the trunnion at one or the other end of the hollow casing, and consequently permit the car body to be dumped on either side, as is fully explained in my Patent No. 755,207, above mentioned. In operation, the pressure is admitted on one or the other side of the fixed piston Y through the passages T in the hollow rod A by a suitable controlling valve, to move the car body in one or the other direction, as will be understood.

Describing now my improved locking device I may state at the outset that its purpose is to lock and hold in stationary position the moving part of the motor—to wit, the cylinder—and consequently since the cylinder is connected to the car body to lock the latter likewise in stationary position.

The locking device shown in the drawings illustrates one form which my improvement may take. This device is shown in duplicate on each side of the car, that on the right side of Fig. 1 comprising the pin I, the notched extension G, rigidly connected to the motor cylinder, and the openings H and H′ (see Figs. 2 and 5) formed in the upwardly extending webs K and L of the stationary base plate O. These openings H and H′ are adapted to register with the opening in the member G when the cylinder is reciprocated, so that it occupies its extreme right-hand position, (see Fig. 1) the pin I being then adapted to be inserted through said openings and to be retained in that position, whereby the cylinder is immovably locked to the base plate O.

For the purpose of locking the cylinder in its extreme left-hand position, the locking device is duplicated on the left-hand side of the car, the same comprising the pin *i*, the notched member *g*, and the openings *h* and *h′* (*h′* not being shown) in the vertically extending webs of the base plate, these being in all respects similar to the locking means on the right-hand side of the car, previously described.

Describing next the means for retaining the pins I and *i* in locking position, it will be noted that each of said pins is provided with a spline or lug J, (see Fig. 5) also with a handle, the said spline and handle projecting from the pin in different directions. It will be noted that the aforesaid openings (see *h*, Fig. 1) in the webbed portions of the base plate are keyhole-shaped to fit and receive the spline portions of the pins. It is apparent that to insert the pins the spline portion must be down, and, further, that after said pins are inserted through the openings and the handles turned vertically downward, which is the position they will naturally seek and retain, due to the weight of the handles, that said splines will then engage the sides of the rear openings H′ and $h'$ in the vertical webs, and that said pins cannot in that position be withdrawn from their locking position.

The pins are preferably attached to the car by chains, as shown, to prevent their being lost.

Describing now the means for cushioning the cylinder and relieving it and the connected parts from shock when it reaches its extreme limit of motion, one of the forms which my invention may take in this respect is shown in the drawings and may be described as follows: The cylinder D, hereinafter called the "cushion cylinder", is rigidly secured to the motor cylinder B and reciprocates therewith, the same reciprocating, like the motor cylinder, upon a fixed piston Z and piston rod C. The valves F and $f$ at the ends of the cushion cylinder are adapted to allow outside air to be sucked through them into the cylinder, but to resist the passage of cylinder air out of the cylinder. The opening E is an opening made through the walls of the cushion cylinder at its middle portion.

The operation of the cushion cylinder is as follows: When steam or compressed air, &c., is applied to the motor cylinder and it is driven from one side of the car to the other, the cushion cylinder travels with it, and as soon as the central opening E in the cushion cylinder passes the piston Z the air entrapped between said piston and the walls of the cushion cylinder is compressed for the reason that the valves F or $f$ (as the case may be) at the end of the cylinder resists the escape of air out of the cylinder, and the piston Z of course fits steam-tight within its cylinder. This compression of air gradually increases to the end of the stroke, and the moving parts are thereby gradually brought to a standstill, thus relieving the various parts of the car from shock and excessive strain.

The spiral springs R and S (shown in Fig. 1 as surrounding the ends of the piston rod C) are held in fixed position at the sides of the car and so placed that the cylinder somewhat prior to reaching its extreme limits of travel strikes against one of said springs, with the result that the work of compressing done upon said spring brings the moving parts gradually to a stop.

Obviously some features of this invention may be used without others, and the invention may be embodied in widely varying forms.

Therefore, without limiting the invention to the construction shown and described, nor enumerating equivalents, I claim, and desire to obtain by Letters Patent, the following:

1. In a motor-operated dumping car and the like, a reciprocating motor cylinder, a fixed piston and piston rod for said cylinder, connections between said cylinder and the dumping car body, a member on said cylinder provided with an opening, a member on a fixed part of the car also provided with an opening, and a locking pin adapted to be received through said openings when the cylinder has been shifted so that said openings are opposite, substantially as and for the purposes set forth.

2. In a motor-operated dumping car and the like, a reciprocating motor cylinder, a fixed piston and piston rod for said cylinder, connections between said cylinder and the dumping car body, a member on said cylinder provided with an opening, a member on a fixed part of the car also provided with an opening, a locking pin adapted to be received through said openings when the cylinder has been shifted so that said openings are opposite, and means for retaining said pin in its locking position, substantially as and for the purposes set forth.

3. In a motor-operated dumping car and the like, a reciprocating motor cylinder, a fixed piston and piston rod for said cylinder, connections between said cylinder and the dumping car body, a member on said cylinder provided with an opening, a member on a fixed part of the car also provided with an opening, and a locking pin adapted to be received through said openings when the cylinder has been shifted so that said openings are opposite, said pin being provided with a handle and a lug, which project outwardly from said pin in different directions, one of the aforesaid openings being so adapted to said lug that when the pin is inserted through the openings and turned so that its handle extends vertically downward, that the said lug abuts against the side of one of said openings which is so adapted, and thereby prevents the pin from being withdrawn, substantially as and for the purposes set forth.

4. In a motor-operated dumping car and the like, a reciprocating motor cylinder, a fixed piston and piston rod for said motor cylinder, connections between said motor cylinder and the dumping car body, a cushion cylinder attached to said motor cylinder and reciprocating therewith, a fixed piston and piston rod for said cushion cylinder, an opening through the wall of said cushion cylinder in the middle part thereof, and a valve at each end of said cushion cylinder adapted to permit air to be sucked into said cylinder, but to resist its being forced out of said cylinder, substantially as and for the purposes set forth.

5. In a motor-operated dumping car and the like, a reciprocating motor cylinder, a fixed piston and piston rod for said cylinder, connections between said cylinder and the dumping car body, a fixed spring buffer or buffers against which the end or ends of said cylinder abuts at the limits of its travel, substantially as and for the purposes set forth.

6. In a motor-operated dumping car and the like, a reciprocating motor cylinder, a fixed piston and piston rod for said motor cylinder, connections between said motor cylinder and the dumping car body, a cushion cylinder attached to said motor cylinder and reciprocating therewith, a fixed piston and piston rod for said cushion cylinder, and a valve at each end of said cushion cylinder adapted to permit air to be sucked into said cylinder but to resist its being forced out of said cylinder, substantially as and for the purposes set forth.

7. The combination with a car body supported to tilt and travel laterally, of a cylinder arranged to travel laterally back and forth and connected with the car body for imparting to the car body its laterally traveling movement, means for actuating the cylinder, means for tilting the car body during its traveling movement, and a fluid cushioning device for checking the movement.

8. The combination with a car body supported to tilt and travel laterally, of a cylinder arranged to travel laterally back and forth and connected with the car body for imparting to the car body its laterally traveling movement, means for actuating the cylinder, means for tilting the car body during its traveling movement, and a fluid cushioning device moving with the actuating cylinder.

9. A car body mounted to tilt and travel laterally, in combination with a laterally traveling motor for actuating the car body, means whereby the car body tilts during its lateral movement, and a cushioning cylinder effective to cushion the movement of the car body at the ends in each direction.

10. A car body mounted to move laterally, in combination with a laterally moving motor, and cushioning means independent of the motor but moving therewith.

11. The combination with a laterally movable car body, of a laterally movable operating cylinder connected therewith, and a laterally movable cushioning cylinder having a movement co-extensive with that of the motor.

12. The combination with a tilting car body and a bodily movable operating cylinder connected therewith, of a bodily movable cushioning cylinder connected to move with the motor.

13. The combination with a movable car body and a longitudinally movable operating cylinder connected therewith, of a longitudinally movable cushioning cylinder carried by the operating cylinder.

14. The combination with a tilting and bodily movable car body, of a longitudinally movable operating cylinder having a movement co-extensive with the bodily movement of the car body, and a cushioning cylinder carried by the operating cylinder.

15. The combination with a tilting and bodily movable car body, of a longitudinally movable operating cylinder having a movement co-extensive with the bodily movement of the car body, and a movable cushioning device having a movement co-extensive with the lateral movement of the car body.

16. In a dumping car, the combination with a laterally movable car body, and means for moving it to discharging position, of means independent of the actuating mechanism for controlling the rate of movement of the car body, substantially as described.

17. In a dumping car, the combination with a laterally movable car body, and means for moving it to discharging position, of fluid checking means separate from the actuating mechanism for controlling the movement of the car body, substantially as described.

18. In a dumping car, the combination with a pivoted and bodily movable car body, and means for moving and tilting it, of means independent of the actuating mechanism for controlling the rate of movement of the car body, substantially as described.

19. In a dumping car, the combination with a pivoted and bodily movable car body, and means for moving bodily and tilting it, of fluid checking means separate from and independent of the actuating mechanism for controlling the movement of the car body, substantially as described.

20. In a dumping car, the combination with a pivoted and bodily movable car body, and a power cylinder for moving the car body, of fluid checking means separate from and independent of the power cylinder for controlling the movement of the car body, substantially as described.

21. In a dumping car, the combination with a pivoted and bodily movable car body, and a power cylinder for moving the car body, of fluid checking means moving with the actuating means for controlling the movement of the car body, substantially as described.

22. In a dumping car, the combination with a laterally movable car body, and means for actuating the same, of means moving laterally with the car body for controlling the movement thereof, substantially as described.

23. In a dumping car, the combination with a pivoted and bodily movable car body, and a power cylinder for moving the car body, of fluid checking means moving with the actuating means and carried thereby for controlling the movement of the car body, substantially as described.

24. In a dumping car, the combination with a pivoted and bodily movable car body, and a movable power cylinder for moving the car body, of a movable fluid checking cylinder for controlling the movement of the car body, substantially as described.

25. In a dumping car, the combination with a movable car body, of actuating means therefor, means for positioning said actuating means to move the car body to opposite sides, and means independent of the actuating means and effective in both directions for controlling the movement of the car body, substantially as described.

26. The combination with a bodily movable car body, and a motor for moving it, of a cushioning device constructed to automatically check the movement at the ends and to permit free movement at an intermediate position.

27. The combination with a movable car body, and a motor for moving it in both directions, of a cushioning device comprising a cylinder closed at the ends and open at the middle.

28. The combination with a bodily movable car body, and a motor for moving it, of a cushioning device constructed to automatically check the movement at the ends and to permit free movement at an intermediate position, and means permitting unretarded movement away from the ends.

29. The combination with a movable car body, and a motor for moving it in both directions, of a cushioning device comprising a cylinder closed at the ends and open at the middle, and means permitting unretarded movement away from the ends.

30. The combination with a tilting and laterally movable car body, and an operating motor having a corresponding movement, of a cushioning device moving with the motor for checking the movement at the ends and permitting free movement away from the ends.

31. A car body mounted to move laterally from a central position in either direction, in combination with a motor mounted to move laterally to move the car body, and cushioning means independent of the motor to move therewith.

32. The combination with a tilting and laterally movable car body, of a movable operating cylinder connected therewith in such manner as to tilt and move the car body laterally in either direction from a central position, and a movable cushioning cylinder connected to move with the motor.

33. In a dumping car, the combination with a car body movable laterally in either direction from a central position, and motor means for moving it to discharging position, of means independent of the actuating mechanism for controlling the rate of movement of the car body in either direction.

34. In a dumping car, the combination with a pivoted and bodily movable car body, means for moving and tilting it to either side from a central position, means independent of the actuating mechanism for controlling the rate of movement of the car body.

In testimony whereof, I affix my signature in the presence of two witnesses, this 1st day of June, 1907.

CARL P. ASTROM.

In the presence of—
JULIAN S. WOOSTER,
GEO. A. HOFFMAN.